(12) United States Patent
Lacey et al.

(10) Patent No.: US 11,122,039 B2
(45) Date of Patent: Sep. 14, 2021

(54) NETWORK MANAGEMENT

(71) Applicant: Comptel Oy, Helsinki (FI)

(72) Inventors: Stephen Lacey, Nummela (FI); Mikko Jarva, Petaling Jaya (MY)

(73) Assignee: Comptel Oy, Helsinki (FI)

(*) Notice: Subject to any disclaimer, the term of this patent is extended or adjusted under 35 U.S.C. 154(b) by 193 days.

(21) Appl. No.: 16/064,524

(22) PCT Filed: Apr. 12, 2016

(86) PCT No.: PCT/FI2016/050236
§ 371 (c)(1),
(2) Date: Jun. 21, 2018

(87) PCT Pub. No.: WO2017/109272
PCT Pub. Date: Jun. 29, 2017

(65) Prior Publication Data
US 2019/0014112 A1      Jan. 10, 2019

(30) Foreign Application Priority Data

Dec. 23, 2015 (MY) .............................. PI2015704758

(51) Int. Cl.
*H04L 29/06* (2006.01)
*G06F 9/50* (2006.01)
(Continued)

(52) U.S. Cl.
CPC ............ *H04L 63/0876* (2013.01); *G06F 9/50* (2013.01); *G06F 21/316* (2013.01); *G06F 21/44* (2013.01); *G06F 21/552* (2013.01); *H04L 9/30* (2013.01); *H04L 9/3247* (2013.01); *H04L 63/0823* (2013.01); *H04L 63/1425* (2013.01); *H04L 41/0823* (2013.01); *H04L 41/0896* (2013.01); *H04L 43/16* (2013.01); *H04L 63/123* (2013.01)

(58) Field of Classification Search
CPC ... H04L 63/0876; H04L 63/0823; H04L 9/30; H04L 9/3247; H04L 63/1425; H04L 43/16; H04L 41/0896; H04L 41/0823; H04L 63/123; H04L 63/20; G06F 9/50; G06F 21/44; G06F 21/316; G06F 21/552; G06F 9/5011; G06F 11/3612
USPC .......................................................... 726/6
See application file for complete search history.

(56) References Cited

U.S. PATENT DOCUMENTS

| | | | |
|---|---|---|---|
| 9,544,145 B2 | 1/2017 | Ishizaka et al. | |
| 2003/0174680 A1* | 9/2003 | Kuan | ............... H04L 1/188 370/338 |

(Continued)

FOREIGN PATENT DOCUMENTS

| | | |
|---|---|---|
| JP | 2011250335 A | 12/2011 |
| JP | 2015011659 A | 1/2015 |

(Continued)

*Primary Examiner* — Mohammad W Reza

(57) ABSTRACT

According to an example aspect of the present invention, there is provided an apparatus comprising memory configured to store information characterizing at least one run-time behavioural pattern, at least one processing core configured to perform a behavioural determination based at least partly on the stored information, concerning a network node, and to verify, as a response to a result of the behavioural determination, whether the network node is comprised on a list of valid network nodes.

26 Claims, 7 Drawing Sheets

(51) Int. Cl.

| | |
|---|---|
| *G06F 21/44* | (2013.01) |
| *G06F 21/31* | (2013.01) |
| *G06F 21/55* | (2013.01) |
| *H04L 9/30* | (2006.01) |
| *H04L 9/32* | (2006.01) |
| *H04L 12/26* | (2006.01) |
| *H04L 12/24* | (2006.01) |

(56) References Cited

U.S. PATENT DOCUMENTS

| | | | |
|---|---|---|---|
| 2009/0191847 A1* | 7/2009 | Na | H04L 9/321 |
| | | | 455/411 |
| 2009/0262751 A1* | 10/2009 | Rockwood | H04L 12/413 |
| | | | 370/462 |
| 2009/0293122 A1 | 11/2009 | Abdel-Aziz et al. | |
| 2012/0159481 A1* | 6/2012 | Anderson | G06F 9/45558 |
| | | | 718/1 |
| 2012/0304288 A1 | 11/2012 | Wright et al. | |
| 2015/0063166 A1 | 3/2015 | Sif et al. | |
| 2015/0082308 A1 | 3/2015 | Kiess et al. | |
| 2015/0163108 A1* | 6/2015 | Wong | H04L 41/5009 |
| | | | 709/224 |
| 2015/0172104 A1 | 6/2015 | Brandwine | |
| 2015/0180730 A1 | 6/2015 | Felstaine et al. | |
| 2015/0358248 A1 | 12/2015 | Saha et al. | |

FOREIGN PATENT DOCUMENTS

| | | |
|---|---|---|
| WO | 2006035928 A | 4/2006 |
| WO | 2014068632 A1 | 5/2014 |
| WO | 2014195890 A1 | 12/2014 |

\* cited by examiner

NETWORK MANAGEMENT

PRIORITY

This application is a U.S. national application of the international application number PCT/FI2016/050236 filed on 12 Apr. 2016, which claims priority of Malaysia application PI2015704758 filed on Dec. 23, 2015, the contents of all of which are incorporated herein by reference.

FIELD

The present invention relates to the field of managing a network, such as for example a communications network.

BACKGROUND

Communication networks, such as for example cellular communication networks, are comprised of network nodes. The network nodes of a network may be subdivided into different node types, for example, a cellular communication network may comprise base stations, base station controllers, switches, gateways and application functions. An internet protocol, IP, network may comprise routers and gateways.

When designing a network, planners may estimate loading situations in a coverage area of the network. For example, in busy sections of cities it may be estimated that communication occurs more often, and at a higher intensity, than in outlying areas. Therefore, in the case of a cellular network, cells in busier areas may be made smaller, and base stations assigned to control these smaller cells may be furnished with sufficient data processing capability to handle high peak loads. For example, the base stations may be equipped with several data processing cards. Likewise, network nodes tasked with conveying data to and from base stations with high anticipated peak loads may be dimensioned to be capable of handling these high loads.

Virtualization of network functions may be employed to simplify network maintenance. In a network where functions have been, at least in part, virtualized, virtualized network functions may be run as software entities on server computers, which may be located in a datacentre, for example. Depending on the type of network function being virtualized, for example depending on whether the function is simple or complex, a virtualized network function, VNF, may be split into multiple VNF components, VNFCs. An example of a simple VNF is a firewall, while a home location register is an example of a complex VNF.

Malicious software may be employed, by criminals, to attack targets. Motivations behind attacks may include, for example, espionage, theft, identity theft, revenge, cyberwarfare and cyberterrorism. Malicious software may take the form of computer viruses, Trojans and rootkits, for example. Countermeasures against malicious software include anti-virus programs, firewalls and data security procedures.

SUMMARY OF THE INVENTION

The invention is defined by the features of the independent claims. Some specific embodiments are defined in the dependent claims.

According to a first aspect of the present invention, there is provided an apparatus, comprising memory configured to store information characterizing at least one run-time behavioural pattern, at least one processing core configured to perform a behavioural determination based at least partly on the stored information, concerning a network node, and to verify, as a response to a result of the behavioural determination, whether the network node is comprised on a list of valid network nodes.

Various embodiments of the first aspect may comprise at least one feature from the following bulleted list:
- the network node is a virtualized network function or component of a virtualized network function
- the at least one processing core is configured to verify the network node has a valid credential
- the at least one processing core is configured to verify whether the network node has valid credentials automatically, without user intervention, as a response to the result of the behavioural determination
- the run-time behavioural pattern comprises at least one of the following four patterns: firstly, an increase in CPU load combined with a decrease in capability of the network node, secondly, an increase in memory usage with no concurrent increase in communications throughput, thirdly, an increase in outgoing traffic from the network node with no corresponding increase in ingoing traffic into the network node, and fourthly, the network node is instantiated and active without being comprised in a first list
- performing the behavioural determination comprises requesting run-time information from a computational substrate running the network node
- verifying whether the network node has a valid credential comprises obtaining the credential of the network node and querying, from a verification function, whether the credential is valid
- the verification function comprises a node or function that is in possession of a list of valid credentials
- the credential comprises at least one of the following: a hash of at least part of an execution environment of the network node, a public key of the network node, a private key of the network node, a static feature in data relating to the network node and a cryptographic token
- verifying whether the network node has a valid credential comprises transmitting a signature request to the network node, obtaining in response from the node a cryptographic signature and causing verifying the cryptographic signature is correct
- the signature request comprises a token for the network node to sign, using its private key.

According to a second aspect of the present invention, there is provided a method comprising storing information characterizing at least one run-time behavioural pattern, performing a behavioural determination based at least partly on the stored information, concerning a network node, and verifying, as a response to a result of the behavioural determination, whether the network node is comprised on a list of valid network nodes.

Various embodiments of the second aspect may comprise at least one feature corresponding to a feature from the preceding bulleted list laid out in connection with the first aspect.

According to a third aspect of the present invention, there is provided an apparatus, comprising memory configured to store information characterizing at least one run-time behavioural pattern, at least one processing core configured to perform a behavioural determination based at least partly on the stored information, concerning a network node, and to cause termination of the network node responsive to a result of the behavioural determination.

Various embodiments of the third aspect may comprise at least one feature from the following bulleted list:

the at least one processing core is configured to verify the network node is comprised on a list of valid network nodes the at least one processing core is configured to verify the network node has a valid credential, and to cause the termination also in case the network node has a valid credential and is comprised on the list of valid network nodes the apparatus is configured to determine the run-time behavioural pattern based on run-time observation of the network node.

According to a fourth aspect of the present invention, there is provided a method, comprising storing information characterizing at least one run-time behavioural pattern, performing a behavioural determination based at least partly on the stored information, concerning a network node, and causing termination of the network node responsive to a result of the behavioural determination.

Various embodiments of the fourth aspect may comprise at least one feature corresponding to a feature from the preceding bulleted list laid out in connection with the third aspect.

According to a fifth aspect of the present invention, there is provided an apparatus comprising means for storing information characterizing at least one run-time behavioural pattern, means for performing a behavioural determination based at least partly on the stored information, concerning a network node, and means for verifying, as a response to a result of the behavioural determination, whether the network node is comprised on a list of valid network nodes.

According to a sixth aspect of the present invention, there is provided an apparatus comprising means for storing information characterizing at least one run-time behavioural pattern, means for performing a behavioural determination based at least partly on the stored information, concerning a network node, and means for causing termination of the network node responsive to a result of the behavioural determination.

According to a seventh aspect of the present invention, there is provided a non-transitory computer readable medium having stored thereon a set of computer readable instructions that, when executed by at least one processor, cause an apparatus to at least storing information characterizing at least one run-time behavioural pattern, performing a behavioural determination based at least partly on the stored information, concerning a network node, and verifying, as a response to a result of the behavioural determination, whether the network node is comprised on a list of valid network nodes.

According to an eighth aspect of the present invention, there is provided a non-transitory computer readable medium having stored thereon a set of computer readable instructions that, when executed by at least one processor, cause an apparatus to at least storing information characterizing at least one run-time behavioural pattern, performing a behavioural determination based at least partly on the stored information, concerning a network node, and causing termination of the network node responsive to a result of the behavioural determination.

According to a ninth aspect of the present invention, there is provided a computer program configured to cause a method in accordance with at least one of the second and fourth aspects to be performed.

BRIEF DESCRIPTION OF THE DRAWINGS

FIG. 6 is a flow graph of a method in accordance with at least some embodiments of the present invention, and.

EMBODIMENTS

VNFs or other network nodes running on a network may be listed, to enable an understanding of what nodes are present in the network. Nodes not on the list may also be present, these non-listed nodes comprising legal but hidden nodes, and/or spurious nodes. Once a non-listed node is detected, its credential may be verified to enable discriminating between spurious and legal hidden nodes. Such verification may be automatic, so that as few personnel as possible become aware of the legal hidden nodes. Alternatively or additionally, where a node on the list is compromised by malware, its changed behaviour may be detected by detecting its changed behaviour, enabling termination of the compromised node.

Although discussed in terms of a cellular network, a non-cellular network would equally serve to illustrate an example system. Examples of non-cellular technologies include wireless local area network, WLAN, also known as Wi-Fi, and worldwide interoperability for microwave access, WiMAX. Embodiments of the present invention may also be applied, in suitable form, to wire-line networks, such as IP networks, where wireless links do not occur.

Figure 1:
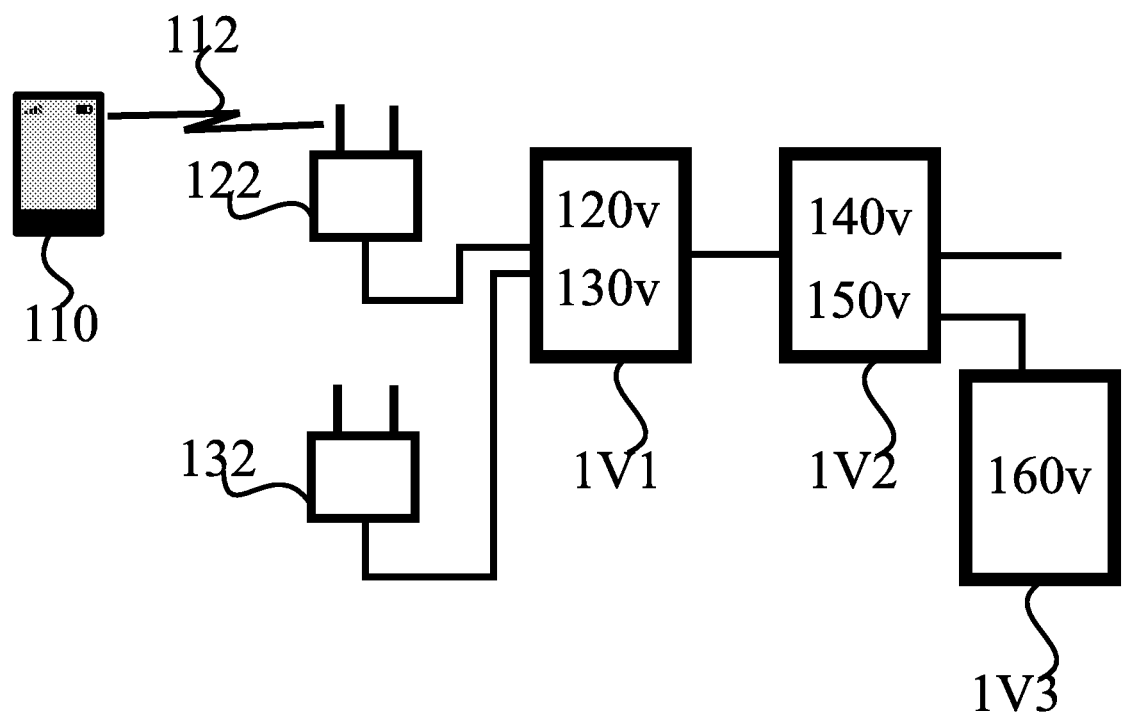
FIG. 1 illustrates an example system capable of supporting at least some embodiments of the present invention.

FIG. 1 illustrates an example system capable of supporting at least some embodiments of the present invention. In the system of FIG. 1, mobile 110 has a wireless link 112 with radio node 122. Radio node 122 is a reduced version of a base station comprising radio hardware but less, or no, information processing functions. Radio node 132 likewise takes the place of a base station in the system of FIG. 1. Radio node 122 and radio node 132 are both separately connected with server 1V1, which comprises a computer system configured with computing resources, such as processing cores and memory, arranged to be able to run the information processing capabilities of base stations that are absent in the radio nodes of FIG. 1. In other words at least part of information processing functions of base stations have been placed in server 1V1 in the system of FIG. 1.

The information processing functions relating to radio node 122 that take place in server 1V1 are denoted as virtualized base station 120v. The information processing functions relating to radio node 132 that take place in server 1V1 are denoted as virtualized base station 130v.

Server 1V2 is in the system of FIG. 1 configured to run virtualized versions of core network nodes. In the system of FIG. 1, server 1V2 runs a virtualized core network node 140v may comprise, for example, a mobility management entity, MME, or a router. Core network node 140v is further operably connected to further core network node 150v. Further core network node 150v may comprise a gateway, for example, configured to provide access to further networks, such as the Internet, for example 150v. In use virtualized base station 120v may receive information from radio node 122 and perform processing operations on the received information. Virtualized base station 120v may be configured to forward information it has processed to virtualized core network node 140v in server 1V2, for example.

Servers 1V1 and 1V2 may be based on generic computation technology, such as a set of x86-architecture multi-core processors or reduced instruction set computing, RISC, processors, for example. Server 1V1 need not be based on the same computation technology as server 1V2.

In general, a virtualized network function may comprise a software entity on generic computing hardware that is configured to perform, at least in part, according to a same specification as a corresponding network function that has not been virtualized, that is, one that runs on dedicated hardware. By generic computing hardware it is meant hardware that is not designed to run a specific type of virtualized network function. In other words, a virtualized network function may comprise a software implementation of a logical network node of a communication network. This has the effect that in terms of other network elements, these other elements needn't know whether the network element has been virtualized or not. Therefore, a virtualized call session control function, CSCF, for example, can be sent the same kinds of messages as a non-virtualized CSCF. A virtualized network function, VNF, may comprise of multiple virtualized network function components, VNFCs.

The system of FIG. 1 offers advantages over a system that lacks virtualized network functions. In detail, virtualized base station 120v may be scaled according to need, whereas a non-virtualized base station must be dimensioned for the maximum expected load at all times. For example, when load is light, virtualized base station 120v may be run with a few, or only one, processing core in server 1V1, while other processing cores of server 1V1 may be used for other processing tasks, such as grid computing, for example. As a response to increasing load via radio node 122, virtualized base station 120v may be allocated more processing cores in a dynamic network management action.

The system of FIG. 1 may perform network management actions, each network management action involving at least one virtualized network function or virtualized network function component. Virtualized network functions may comprise, for example, virtualized base stations and/or virtualized core network nodes. The network management action may comprise at least one of the following: increasing resources allocated to a virtualized network function or virtualized network function component, decreasing resources allocated to a virtualized network function or virtualized network function component, starting a virtualized network function or virtualized network function component instance, and terminating a virtualized network function or virtualized network function component instance.

Starting a virtualized network function or virtualized network function component instance may comprise initializing, for example based at least in part on a template or image, a new virtualized network function or virtualized network function component. In terms of FIG. 1, this might comprise, for example, initializing a further virtualized core network node, "155v" in server 1V2. The new virtualized network function, or node, may be allocated resources in terms of at least one processor core and memory. A new virtual network function may be considered onboarded once associated software images/templates have been uploaded to the virtual infrastructure and have been added to a list of virtualized network functions, and instantiated once it has been assigned computational resources. Normally, virtualized network functions are both onboarded and instantiated.

Terminating a virtualized network function may correspondingly comprise ending processor tasks that run the virtualized network function. Terminating may be smooth in nature, wherein, for example, any users served by a virtualized network function that is to be terminated are handed over to another virtualized network function, to avoid broken connections. Terminating may also be abrupt, for example where it is determined a virtualized network function is misbehaving, operators may select abrupt termination. Misbehaviour may be determined by comparing a VNF's behaviour to a behavioural pattern, for example.

Alternatively to two servers 1V1 and 1V2, another number of servers may be employed in dependence of the embodiment and network implementation. For example, one, three or seven servers may be used. In general, a server is an example of a computation apparatus arranged to run virtualized network functions and/or virtualized network function components. Such an apparatus may alternatively be referred to as a computational substrate.

The system of FIG. 1 comprises further server IV3, which runs a virtualized control node 160v. The control node may, with equal facility, be non-virtual, or be virtualized and running on server IV1 or IV2, for example. Where reference is herein made to a control node for brevity, it is to be understood that a virtualized control node 160v may be configured to perform similar actions and assume a similar role as a distinct control node.

A control node is configured to collect information concerning the functioning of network nodes comprised in the network of FIG. 1. For example, the control node may be configured to perform a watchdog function to detect error conditions in other nodes. The control node may be arranged to obtain run-time information that enables the control node, or another node, to derive a behavioural pattern that characterizes behaviour of another node or nodes. A behavioural pattern of virtualized core network node 140v, for example, may be modified in case virtualized core network node 140v is infected with a virus.

A control node may, as described above in connection with FIG. 1, obtain run-time information that enables the control node, or another node, to derive a behavioural pattern that characterizes behaviour of another network node or nodes. This information may be obtained by requesting from a server running the network node or nodes, for example. Run-time information relates to information generated while the node or virtualized network element is operating, that is, functioning. Likewise a run-time behavioural pattern characterizes behaviour during operation.

Where a malicious program, such as a virus, Trojan or rootkit, manages to obtain access to a network management function, such as VIM, this malicious program may cause a virtualized network function to be instantiated into the network, on a suitably selected server. A malicious program may additionally, or alternatively, infect an already existing VNF in the network. A virtualized network function instantiated by a malicious program will be referred to as a spurious virtualized network function. A spurious virtualized network function may be used to perform actions that run counter to the interests of the network operator, including spying on communications conveyed via the network, transmitting spam from the network, or facilitating covert communications not visible to the operator or law enforcement, for example. A spuriously instantiated VNF may be instantiated via a compromised VIM, without visibility in a VNFM or NFVO layer.

The control node may obtain behavioural patterns that concern network nodes, either physical nodes, virtualized network functions, or servers. A behavioural pattern may comprise at least one of the following:
- an increase in CPU load combined with a decrease in capability of the network node
- an increase in memory usage with no concurrent increase in communications throughput
- an increase in outgoing traffic from the network node with no corresponding increase in ingoing traffic into the network node
- Or more intricate, but improbable change in established patterns reflected across multiple metrics The increase in central processing unit, CPU, load combined, that is, taking place at the same time, with a decrease in capability may imply the CPU resources are being spent on a spurious virtualized network function or node. A spurious node may comprise a node as in FIG. 1, which is infected with malicious software. An increased memory use would normally be associated with higher traffic traversing a node or virtualized network function, however where memory is taken over otherwise, without a concurrent increase in communications throughput, it may be a signal that spurious activity is going on. An increase in outgoing traffic with no corresponding increase in ingoing traffic may indicate a virtualized network function or node has become a source of traffic, rather than a relay of traffic, where applicable. Such traffic may be spurious, such as spam or denial-of-service traffic. Denial-of-service traffic may be comprised in a denial-of-service attack. In addition to, or alternatively to, these behavioural patterns, patterns may be received in the control node from, for example, the police or anti-malware organizations, such received patterns characterizing behaviour of spurious virtualized network functions generated by specific malicious software items. A further example of a behavioural pattern is one established by observation of the VNF in question, in other words, where a VNF begins to behave in a way that differs from a previously established behavioural pattern characteristic of itself, the control node may be triggered to perform actions as described herein. The pattern may be established observationally, for example.

The control node may be configured to, responsive to determining that a network node, that is, a virtualized network function, server or node, is potentially spurious, verify at least one credential of this network node. The determining may be based on determining the network node acts in accordance with the behavioural pattern, in case the pattern characterizes spuriously acting network nodes, as above, or, in case the pattern characterizes behaviour of a properly behaving node, the control node may verify the credential responsive to the network node deviating from the pattern. In other words, verifying the credential may be triggered by a determination involving the behavioural pattern. The pattern itself may be expressed as characterizing normal or abnormal behaviour.

The verifying may be performed by the control node automatically, without user intervention. In other words, the control node may be configured to monitor network nodes, their behaviour and their credentials as an automated process. The control node may be configured to take actions responsive to the verifying indicating the network node has no valid credential. Such actions may also be automatic.

In case credential verification fails, that is, the network node has no valid credential, the control node may be configured to cause action to be taken with respect to the network node. For example, the network node may be, scaled down, placed in quarantine or terminated. Quarantine may comprise rendering the network node incapable of communicating. A user may be informed of the action taken with respect to the network node.

Verifying the credential may comprise obtaining the credential from the network node, for example by requesting and responsively receiving it. Further, the control node may check, whether the credential is comprised in a list, the list comprising a list of credentials of legitimate network nodes. In case the credential is not on the list, the verification may be considered a failure. In case the credential is comprised on the list, the verification may be considered a success. Checking the list may comprise querying from a verification function, whether the credential is on the list. The query, sent from the control node to the verification function, may comprise the credential, or a hash of the credential, for example. In some embodiments, where the network node fails to provide a credential upon being requested to provide it, the verification is considered a failure.

The credential may comprise a hash of an execution environment of the network node, or part thereof. The credential may comprise a public encryption key of the network node. A public key and corresponding private key form a public-key encryption key pair. Alternatively or additionally, the credential may comprise a cryptographic token or signature.

In some embodiments, verifying the credential comprises transmitting, to the network node, a signature request. The signature request may comprise a token, such as a nonce, for the network node to sign, using its private key. Alternatively, it may be assumed the network node knows what information to sign, for example, the network node may be expected to sign a timestamp comprised in a header field of the signature request, thus rendering unnecessary the provision of a separate token to sign. The signature may be verified using the public key of the network node, which may be available in the control node or a verification function, for example.

Some network nodes may initially appear as spurious despite not being spurious. For example legal interception of telephone or data traffic may be arranged by instantiating an interception-type VNF, which however is not onboarded or included in a list of valid nodes, to thereby conceal the presence of the legal interception. In this case, even some employees of the network operator will be unable to determine, which internet protocol, IP, addresses or telephone subscriptions are the subject of legal interception, which increases security. Otherwise criminals might gain access to information on legal interception by infiltrating personnel into network operator workforces. Legal interception network nodes may be provided with valid credentials, which may be, as described above, verified to separate legal interception nodes from spurious nodes. Where the verifying takes place automatically, without user intervention, the presence of legal interception, and indeed other legitimate but hidden nodes, can be more effectively concealed while enabling personnel to discover and disarm spurious network nodes.

Starting a lawful interception VNF or insertion into a running VNFC, may comprise, therefore, instantiating the VNF or maintaining the current running VNFC and registering its credential, so that the VNF or VNFC will pass a credential verification performed by a control node in case the control node picks up the legal interception VNF or VNFC, using a behavioural pattern. Registering the credential may comprise entering the credential on a list of valid credentials, or providing a cryptographic credential i.e. in the form of entering a public key to a list of valid credentials while furnishing the VNF itself with the corresponding private key, such that cryptographic signatures produced using the private key are verifiable using the public key. The credential may comprise a static feature in data relating to the VNF or VNFC.

In some embodiments, the control node is configured to inform human users when a node is detected that is not on a list of known nodes. The informing may comprise an indication the VIM may be compromised, since a compromised VIM may be used to instantiate spurious VNFs.

In general, by VNF it may be referred to a specific VNF instance, or a VNFC or set of VNFCs comprised in a VNF instance. A VNF instance may comprise VNFCs that are present on distinct computational substrates.

Figure 2:
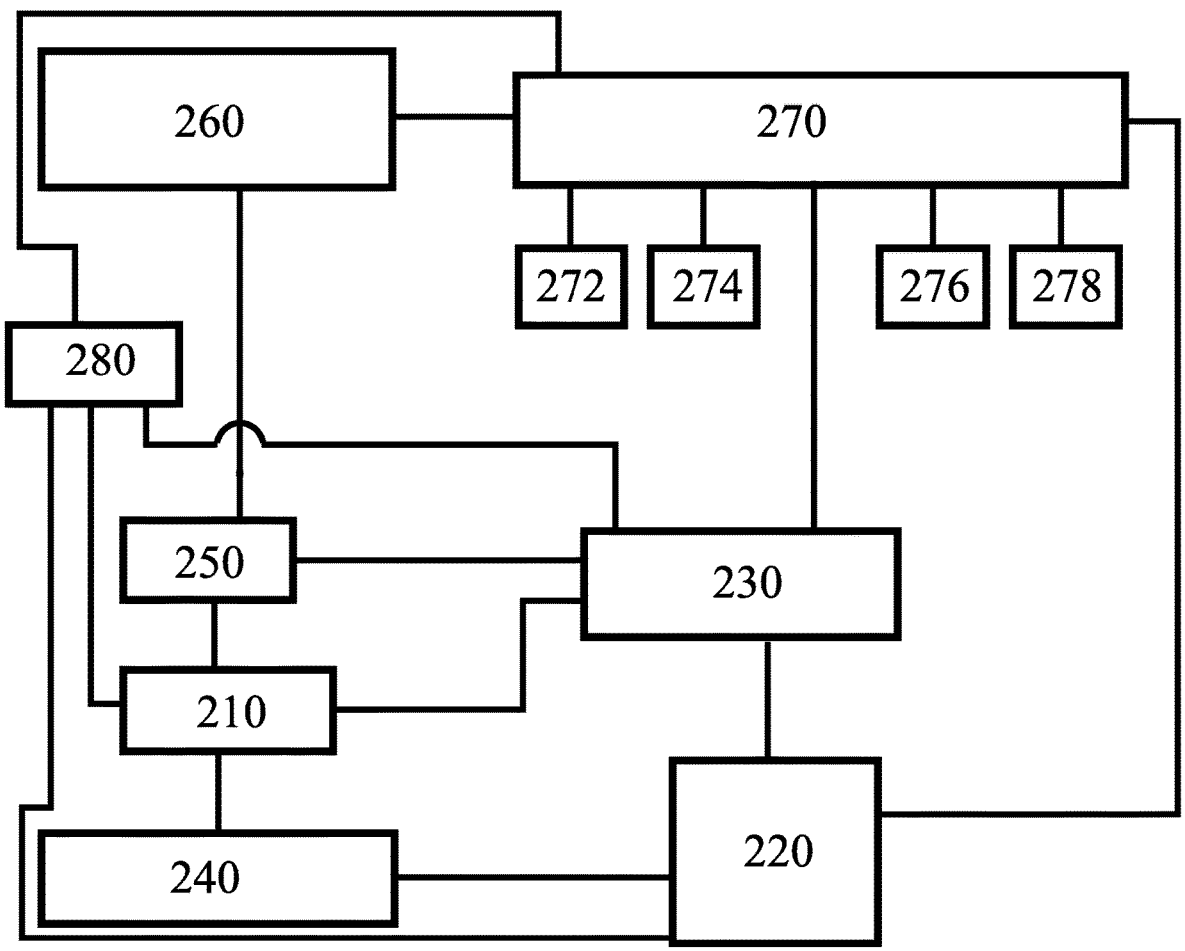
FIG. 2 illustrates an example network architecture in accordance with at least some embodiments of the present invention.

FIG. 2 illustrates an example network architecture in accordance with at least some embodiments of the present invention. In FIG. 2, VNF 210 comprises a virtualized network function, such as for example a virtualized network function as described above in connection with FIG. 1. VNF 210 has an interface with VNF manager 230, wherein VNF manager 230 may be configured to initiate network management actions, for example, responsive to changes in a loading level of virtualized network functions or responsive to a determined fault condition. VNF manager 230 has an interface with virtualized infrastructure manager, VIM, 220. VIM 220 may implement a monitoring function to detect virtualized network functions that cross loading or other predefined thresholds, to responsively trigger network management actions. For example, where a loading level exceeds a first threshold, more resources may be allocated to the virtualized network function, and/or where the loading level decreases below a second threshold, resources may be allocated from the virtualized network function to other uses. NFV orchestrator, NFVO, 270 and/or another node may be configured to respond to a reason code coupled with a score calculated by predictive model defined by a machine leaning process, wherein a reason code coupled with a propensity score associates a network management action with at least one operating condition of the network. The architecture may comprise a plurality of VNFs 210, VIMs 220 and/or a plurality of VNF managers 230.

Both VNF 210 and VIM 220 have interfaces to network functions virtualization infrastructure, NFVI, 240. NFVI 240 may provide a set of hardware and software components that build up the environment in which VNFs are deployed. VNF 210 further has an interface with element manager, EM, 250. EM 250 may provide end-user functions for management of a set of related types of network elements which may include network elements with virtualized network functions or non-virtualized network functions, or both. These functions may be divided into two main categories: Element Management Functions and Sub-Network Management Functions. In some embodiments, EM 250 may be configured to take decisions concerning network management actions, and to cause the decisions to be implemented by signalling concerning them to VNF manager 230, for example. EM 250 may take decisions concerning network management functions as a response to a determined fault condition, for example. EM 250 has an interface with operational support systems and/or business support systems, OSS/BSS 260. OSS/BSS 260 may be configured to support end-to-end telecommunication services. OSS/BSS 260 may implement load monitoring, for example. OSS/BSS 260 in turn has an interface with NFV Orchestrator, NFVO, 270. NFVO 270 may comprise a functional block that manages network service, NS, lifecycles and coordinates the management of the NS lifecycles, VNF lifecycles and NFVI 240 resources to ensure an optimized allocation of resources and connectivity. NFVO 270 has interfaces with each of NS catalogue 272, VNF catalogue 274, network functions virtualization, NFV, instances 276 and NFVI resources 278. VIM 220 may further have an interface with NFVO 270. VNF manager 230 may likewise have an interface with NFVO 270. VNF catalogue 274 may comprise the list of known VNFs referred to above.

In some embodiments, a control node 280 is configured to perform determinations concerning NFVs based on behavioural patterns, as described above. Control node 280 has interfaces to VNF 210 to obtain behavioural information and to NFVO 270 and/or VNFM 230 to check, whether VNF 210 is comprised in a list of known VNFs. Control node 280 may further have an interface with VIM 220. Control node 280 may terminate VNFs by instructing VIM 220 to terminate them. Control node 280 may have predictive functions, or be run on a same physical node as a predictive function.

In some embodiments, to implement a network management resource scaling action, NFVO 270 instructs VIM 220 to give additional resources for at least one VNF 210. When VIM 220 acknowledges the additional resources, the NFVO 270 may inform the virtualized network function manager, VNFM, 230 to scale resources. As an option the NFVO 270 may first request the VNFM 230, if the VNF's are allowed to scale and what resources are needed to scale. In case of scaling down or in, NFVO 270 may inform VNFM 230 to scale VNF's, VNFM 230 may scale the resources and inform NFVO 270 about it, then NFVO 270 may inform the VIM 220 these resources are no longer used and the VIM 220 may then do so. It can also inform the NFVO 270 that the resources are no longer available.

In various embodiments, at least two entities illustrated in FIG. 2 comprise software entities arranged to run on the same hardware resource. For example, control node 280 may comprise a control function, running on a same computational substrate as at least one other element illustrated in FIG. 2.

While FIG. 2 illustrates one example architecture, other architectures are possible in different embodiments of the invention. For example, where the network is an Internet protocol, IP, network, the architecture may be simpler than that illustrated in FIG. 2.

Figure 3:
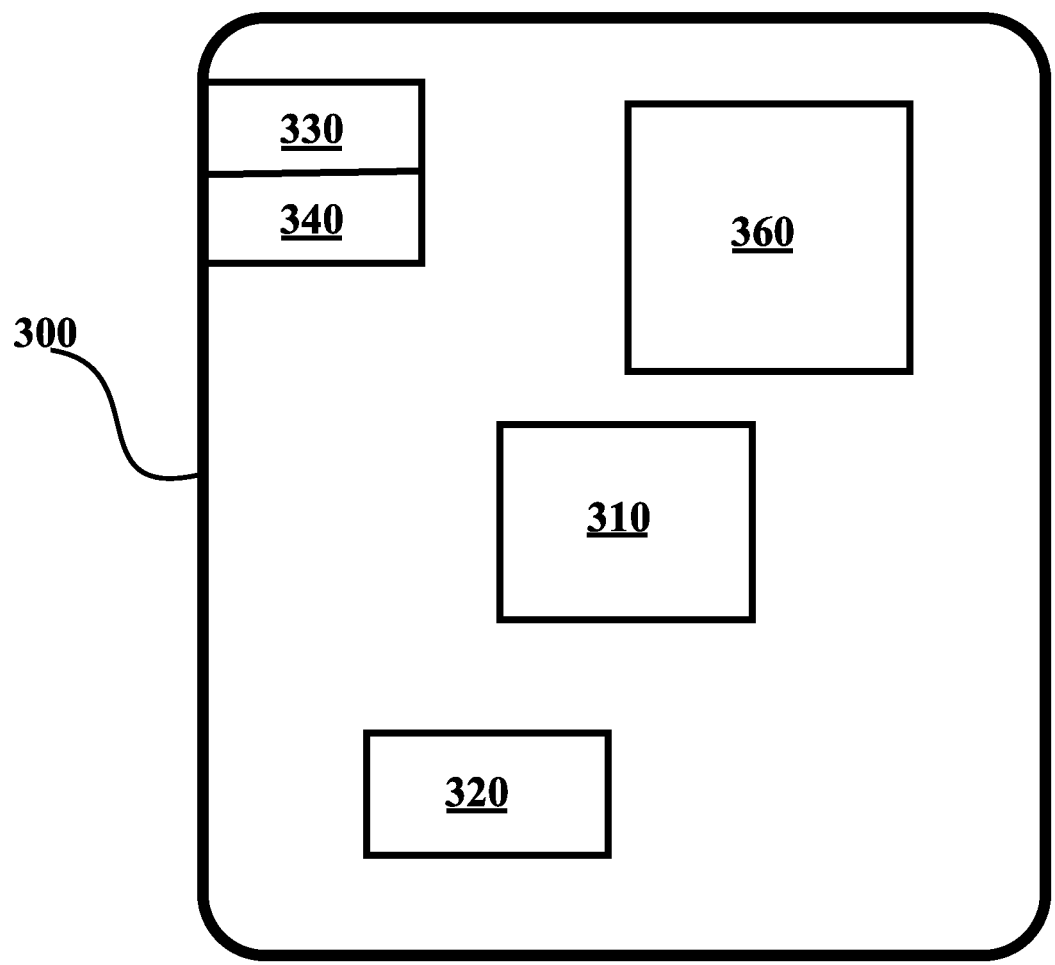
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a server of FIG. 1. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one AMD Opteron and/or Intel Core processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with Ethernet and/or worldwide interoperability for microwave access, WiMAX, standards, for example.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to manage actions regarding quarantined network nodes.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. In some embodiments, device 300 lacks at least one device described above.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
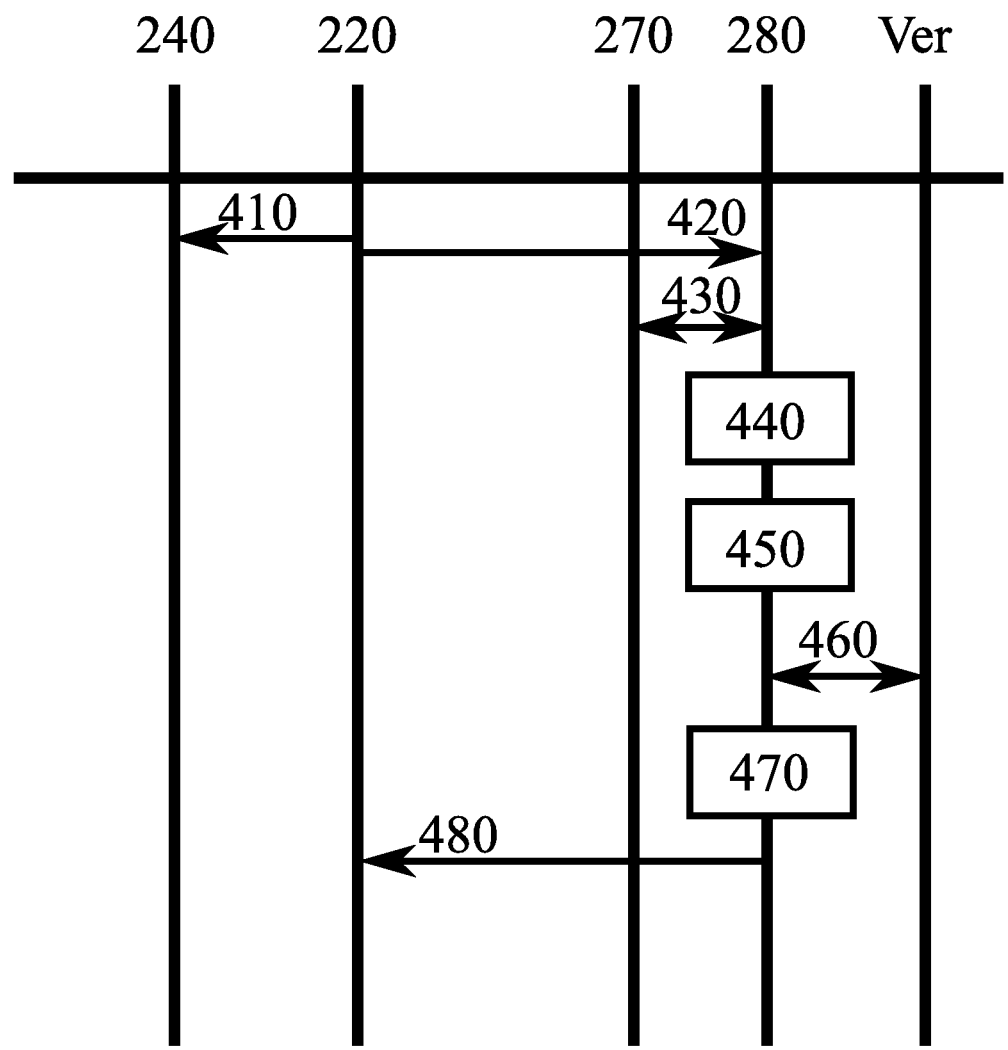
FIG. 4 illustrates signalling in accordance with at least some embodiments of the present invention.

FIG. 4 illustrates signalling in accordance with at least some embodiments of the present invention. On the vertical axes are disposed, from the left to the right, NFVI 240, VIM 220, NFVO 270, control node 280 and, finally, verification function "Ver". Time advances from the top toward the bottom. In some embodiments, verification function "Ver" is comprised in control node 280.

In phase 410, on instantiation of a new VNF or VNF Component, VNFC, VIM 220 will signal to NFVI 240 to such effect. The instantiation may be proper or spurious, wherein it may be spurious in case VIM 220 has been accessed by a malicious program, for example. In phase 420, VIM 220 informs control node 280 of the instantiating. Phase 420 may occur in connection with phase 410, for example at the same time, slightly before or slightly after, as illustrated. The informing of phase 420 may be automatic in nature, or, where applicable, it may be implicit. If implicit, control node 280 may infer an instantiation has taken place by monitoring NFVI 240, for example.

In phase 430, control node 280 checks from a list of known nodes, maintained by or accessible via NFVO 270, whether the newly instantiated VNF or VNFC is on the list. Being comprised on the list is an indication the instantiation is authorized and not spurious. In case the newly instantiated VNF or VNFC is not comprised on the list, processing triggers phase 460, for example simultaneously with phase 440, which corresponds to phase 530 illustrated in FIG. 5. Otherwise, processing advances only to phase 440.

In phase 440, control node 280 establishes a behavioural pattern of the newly instantiated VNF or VNFC's. A behavioural pattern may alternatively, or additionally, be established by observing behaviour of another VNF or VNFC of a similar type, wherein the behaviour of similar-type nodes is expected to be similar. Phase 440 may be several days or even weeks long, as the behavioural pattern is observationally established. The pattern may comprise a pattern concerning at least one of communication intensity, memory usage, CPU loading or the like, for example. Alternatively or additionally, a behavioural pattern may be pre-configured or received from a known a trusted anti-malware company, for example.

In phase 450 a deviation from the behavioural pattern is determined, for example relating to CPU loading, as described above. Responsively, in phase 460, a credential of the newly instantiated VNF or VNFC is verified with verification function "Ver". Examples of how this verifying may proceed have been described above.

In case the credential does not pass verification, in other words where the verification fails, control node 280 may, in phase 470, take a decision concerning an action to take with respect to the instantiated VNF or VNFC. In the example illustrated in FIG. 4, the decision is to terminate the VNF. Control node 280 causes termination of the VNF or VNFC by signalling to VIM 220 to instruct VIM 220 to terminate the VNF.

Figure 5:
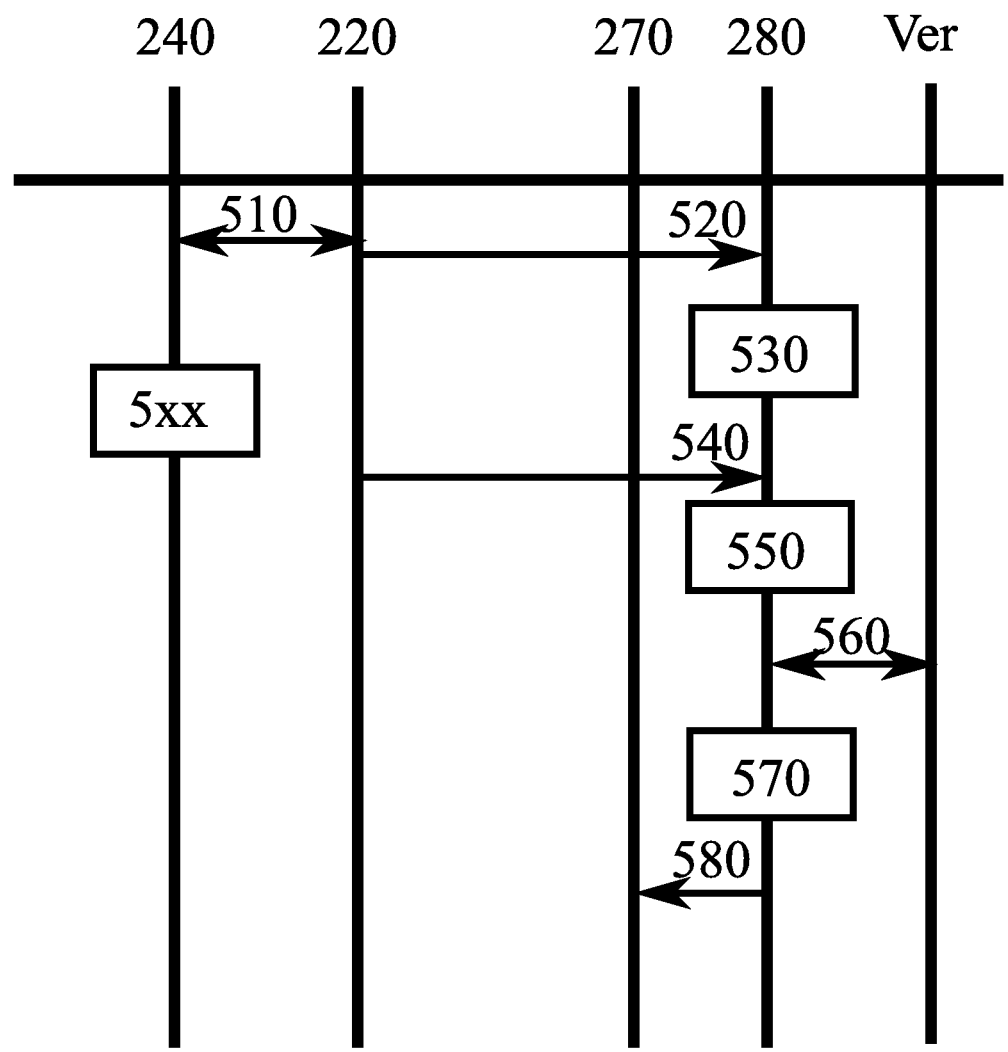
FIG. 5 illustrates signalling in accordance with at least some embodiments of the present invention.

FIG. 5 illustrates signalling in accordance with at least some embodiments of the present invention. The vertical axes correspond to those of FIG. 4. As in FIG. 4, time advances from the top toward the bottom.

In phase 510, an onboarded and instantiated VNF runs normally. This VNF has been instantiated legitimately and performs its role in the network. Phase 520 illustrates how performance of the VNF and its VNF Components is monitored by control node 280 during runtime. Based on monitored activity and/or other sources, as described above, at least one behavioural pattern is established in phase 530. The behavioural pattern reflects either normal behaviour, or determined behaviour that would be abnormal, should it occur.

Event 5xx denotes unauthorized access to the VNF or VNF Component, VNFC, wherein a malicious element is installed in connection with the VNF or VNFC, to modify its behaviour. As a consequence of the malicious element, the performance of the VNF changes, and such modified performance is monitored by control node 280 in phase 540. Responsively, in phase 550, control node 280 makes a behavioural determination based at least partly on the behavioural pattern. Optionally, a check of a credential of the VNF or VNFC is made using verification function "Ver". This is illustrated as phase 560.

In phase 570, a decision is taken in control node 280 concerning what to do with the VNF. In the illustrated example, control node 280 causes a new VNF or VNFC to be instantiated to replace the compromised one, and causes the compromised VNF or VNFC to be shut down. Traffic may be handed over from the compromised VNF or VNFC to the new VNF or VNFC, to ensure a smooth experience for users. Control device 280 may cause these decisions to be carried out in phase 580, by signalling to NFVO 270 in one or two messages. Alternatively, control node 280 might signal to EM, Element Manager, or VNFM, VNF manager to implement these decisions, for example.

Figure 6:
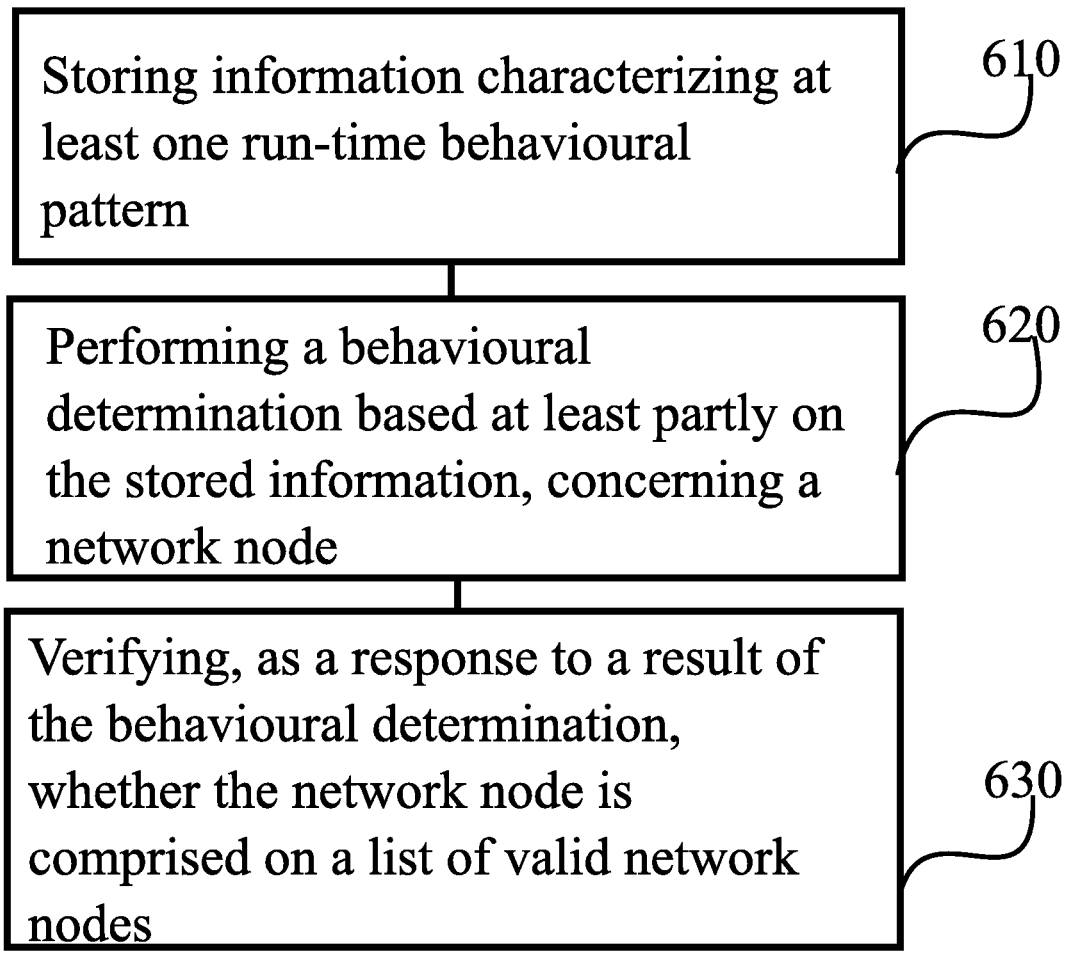

FIG. 6 is a flow graph of a method in accordance with at least some embodiments of the present invention. The phases of the illustrated method may be performed in control node 280, a control function, an auxiliary device or a server computer, for example, or in a control device configured to control the functioning thereof, when implanted therein.

Phase 610 comprises storing information characterizing at least one run-time behavioural pattern. Phase 620 comprises performing a behavioural determination based at least partly on the stored information, concerning a network node. Finally, phase 630 comprises verifying, as a response to a result of the behavioural determination, whether the network node is comprised on a list of valid network nodes. The network node may comprise a node, a virtualized network function, or a server, for example. Phase 630 may comprise verifying whether an identifier of the network node is comprised in the list.

Figure 7:
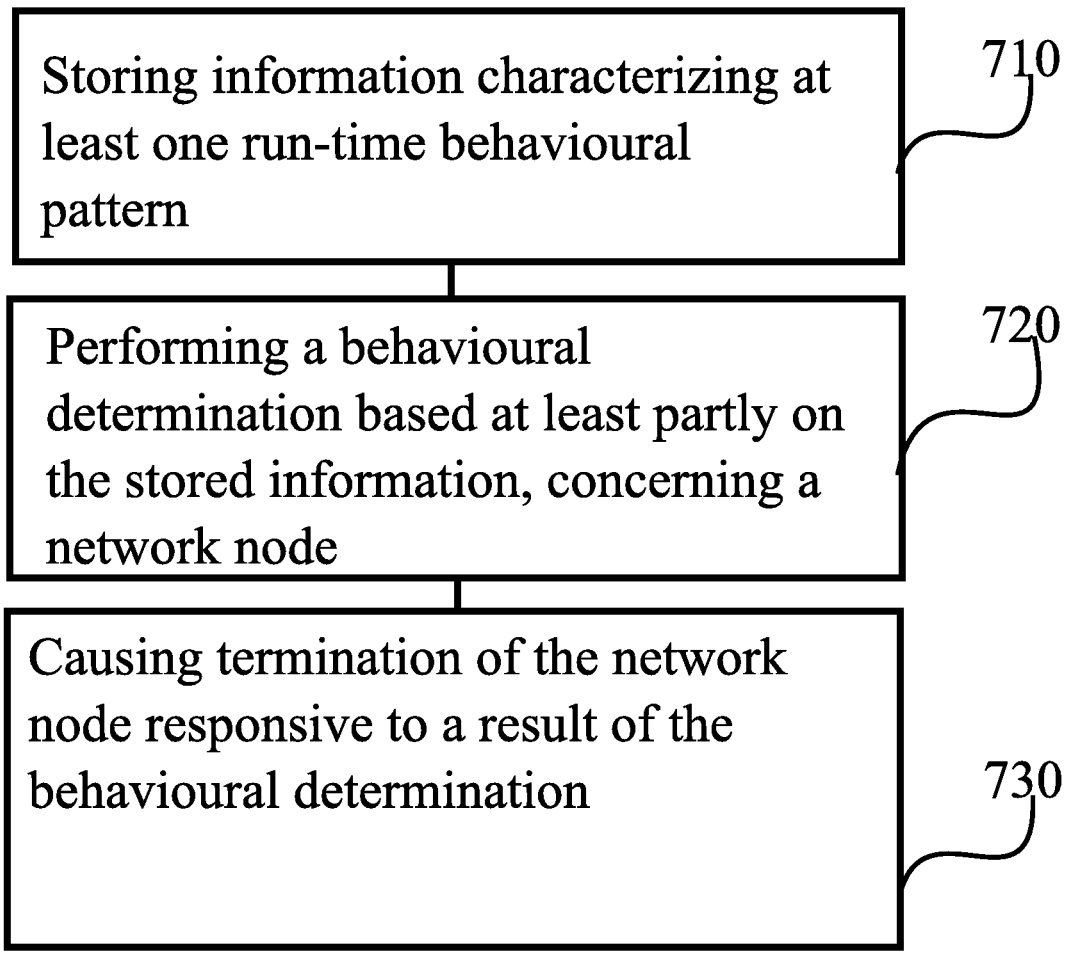
FIG. 7 is a flow graph of a method in accordance with at least some embodiments of the present invention

FIG. 7 is a flow graph of a method in accordance with at least some embodiments of the present invention. The phases of the illustrated method may be performed in control node 280, a control function, an auxiliary device or a server computer, for example, or in a control device configured to control the functioning thereof, when implanted therein.

Phase 710 comprises storing information characterizing at least one run-time behavioural pattern. Phase 720 comprises performing a behavioural determination based at least partly on the stored information, concerning a network node. Finally, phase 730 comprises causing termination of the network node responsive to a result of the behavioural determination.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in managing networks to discover spurious nodes while concealing legitimate, hidden nodes.

ACRONYMS LIST

CPU Central processing unit
EM Element manager
NFVI Network functions virtualization infrastructure
NFVO Network function virtualization orchestrator
OSS/BSS Operational support systems and/or business support systems
VIM Virtualized infrastructure manager
VNF Virtualized network function
VNFC Virtualized network function component
VNFM Virtualized network function manager
WCDMA Wideband code division multiple access

| REFERENCE SIGNS LIST | |
|---|---|
| 110 | Mobile |
| 122, 132 | Radio node |
| 120v, 130v | Virtualized base station |
| 140v | Virtualized core network node |
| 150v | Virtualized further core network node |
| 160v | Virtualized control node |
| 210 | VNF |
| 220 | VIM |
| 230 | VNFM |
| 240 | NFVI |
| 250 | EM |
| 260 | OSS/BSS |
| 270 | NFVO |
| 280 | Control node (FIG. 2) |
| 310-360 | Structure of FIG. 3 |
| 410-4100 | Phases of the method of FIG. 4 |
| 510-530 | Phases of the method of FIG. 5 |

The invention claimed is:

1. An apparatus comprising:
memory configured to store information characterizing at least one run-time behavioural pattern; and
at least one processing core configured to:
perform a behavioural determination based at least partly on the stored information, concerning a network node, and
verify, as a response to a result of the behavioural determination, whether the network node is comprised on a list of valid network nodes, wherein:
the network node is a virtualized network function or component of a virtualized network function that comprises a software implementation of a logical network node of a communication network; and
the run-time behavioural pattern comprises at least one of the following patterns:
an increase in CPU load combined with a decrease in capability of the network node;
an increase in memory usage with no concurrent increase in communications throughput;
an increase in outgoing traffic from the network node with no corresponding increase in ingoing traffic; and
the network node is instantiated and active without being comprised in the list; and
determine, based on the behavioural determination, whether the network node is a legal but hidden node or a spurious node.

2. The apparatus according to claim 1, wherein the at least one processing core is configured to verify the network node has a valid credential.

3. The apparatus according to claim 1, wherein the at least one processing core is configured to verify whether the network node has valid credentials automatically, without user intervention, as a response to the result of the behavioural determination.

4. The apparatus according to claim 1, wherein performing the behavioural determination comprises requesting run-time information from a computational substrate running the network node.

5. The apparatus according to claim 1 wherein verifying whether the network node has a valid credential comprises obtaining the credential of the network node and querying, from a verification function, whether the credential is valid.

6. The apparatus according to claim 5, wherein the verification function comprises a node or function that is in possession of a list of valid credentials.

7. The apparatus according to claim 1, wherein the credential comprises at least one of the following: a hash of at least part of an execution environment of the network node, a public key of the network node, a private key of the network node, a static feature in data relating to the network node and a cryptographic token.

8. The apparatus according to claim 1, wherein verifying whether the network node has a valid credential comprises transmitting a signature request to the network node, obtaining in response from the node a cryptographic signature and causing verifying the cryptographic signature is correct.

9. The apparatus according to claim 8, wherein the signature request comprises a token for the network node to sign, using its private key.

10. A method comprising:
storing information characterizing at least one run-time behavioural pattern;
performing a behavioural determination based at least partly on the stored information, concerning a network node;
verifying, as a response to a result of the behavioural determination, whether the network node is comprised on a list of valid network nodes, wherein:
the network node is a virtualized network function or component of a virtualized network function that comprises a software implementation of a logical network node of a communication network; and
the run-time behavioural pattern comprises at least one of the following patterns:
an increase in CPU load combined with a decrease in capability of the network node;
an increase in memory usage with no concurrent increase in communications throughput;
an increase in outgoing traffic from the network node with no corresponding increase in ingoing traffic; and
the network node is instantiated and active without being comprised in the list; and
determining, based on the behavioural determination, whether the network node is a legal but hidden node or a spurious node.

11. The method according to claim 10, further comprising verifying the network node has a valid credential.

12. The method according to claim 10, wherein the verifying whether the network node has valid credentials is performed automatically, without user intervention, as a response to the result of the behavioural determination.

13. The method according to claim 10, wherein performing the behavioural determination comprises requesting run-time information from a computational substrate running the network node.

14. The method according to claim 10, wherein verifying whether the network node has a valid credential comprises obtaining the credential of the network node and querying, from a verification function, whether the credential is valid.

15. The method according to claim 14, wherein the verification function comprises a node or function that is in possession of a list of valid credentials.

16. The method according to claim 10, wherein the credential comprises at least one of the following: a hash of at least part of an execution environment of the network node, a public key of the network node, a private key of the network node, a static feature in data relating to the network node and a cryptographic token.

17. The method according to claim 10, wherein verifying whether the network node has a valid credential comprises transmitting a signature request to the network node, obtaining in response from the node a cryptographic signature and causing verifying the cryptographic signature is correct.

18. The method according to claim 17, wherein the signature request comprises a token for the network node to sign, using its private key.

19. An apparatus, comprising:
memory configured to store information characterizing at least one run-time behavioural pattern; and
at least one processing core configured to:
perform a behavioural determination based at least partly on the stored information, concerning a network node, and
cause termination of the network node responsive to a result of the behavioural determination, wherein:
the network node is a virtualized network function or component of a virtualized network function that comprises a software implementation of a logical network node of a communication network; and
the run-time behavioural pattern comprises at least one of the following patterns:
an increase in CPU load combined with a decrease in capability of the network node;
an increase in memory usage with no concurrent increase in communications throughput;
an increase in outgoing traffic from the network node with no corresponding increase in ingoing traffic; and
the network node is instantiated and active without being comprised in the list; and
determine, based on the behavioural determination, whether the network node is a legal but hidden node or a spurious node.

20. The apparatus according to claim 19, wherein the at least one processing core is configured to verify the network node is comprised on a list of valid network nodes.

21. The apparatus according to claim 20, wherein the at least one processing core is configured to verify the network node has a valid credential, and to cause the termination also in case the network node has a valid credential and is comprised on the list of valid network nodes.

22. The apparatus according to claim 19, wherein the apparatus is configured to determine the run-time behavioural pattern based on run-time observation of the network node.

23. A method, comprising:
storing information characterizing at least one run-time behavioural pattern;
performing a behavioural determination based at least partly on the stored information, concerning a network node, wherein:
the network node is a virtualized network function or component of a virtualized network function that comprises a software implementation of a logical network node of a communication network; and
the run-time behavioural pattern comprises at least one of the following patterns:
an increase in CPU load combined with a decrease in capability of the network node;
an increase in memory usage with no concurrent increase in communications throughput;
an increase in outgoing traffic from the network node with no corresponding increase in ingoing traffic; and
the network node is instantiated and active without being comprised in the list;
causing termination of the network node responsive to a result of the behavioural determination; and
determining, based on the behavioural determination, whether the network node is a legal but hidden node or a spurious node.

24. The method according to claim 23, further comprising verifying the network node is comprised on a list of valid network nodes.

25. The method according to claim 24, further comprising verifying the network node has a valid credential, wherein the termination is caused also in case the network node has a valid credential and is comprised on the list of valid network nodes.

26. The method according to claim 23, further comprising determining the run-time behavioural pattern based on run-time observation of the network node.

* * * * *